United States Patent Office 3,534,012
Patented Oct. 13, 1970

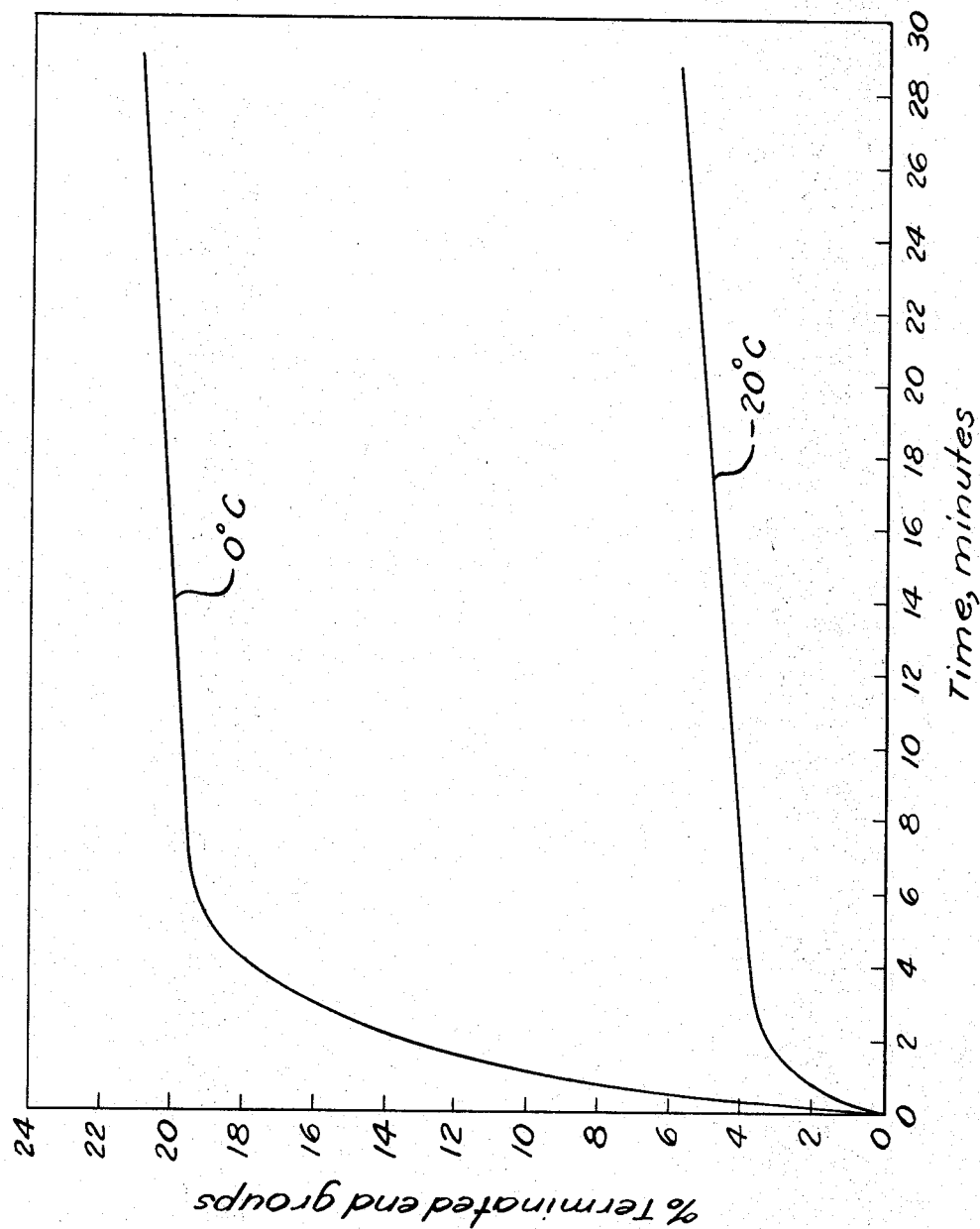

3,534,012
ANIONIC POLYMERIZATION OF NUCLEAR HALOGENATED STYRENES
Kent S. Dennis, Midland, Mich., assignor to The Dow Chemical Company, Midland, Mich., a corporation of Delaware
Continuation-in-part of application Ser. No. 624,033, Mar. 17, 1967. This application May 1, 1969, Ser. No. 820,996
Int. Cl. C08f 7/06, 7/00
U.S. Cl. 260—91.5
11 Claims

ABSTRACT OF THE DISCLOSURE

A process for the anionic polymerization of nuclear halogenated styrenes employing as the catalyst an alkali metal complex, then adding an external terminating agent and recovering the polymer.

---

This application is a continuation-in-part of my co-pending patent application Ser. No. 624,033, filed Mar. 17, 1967, now Pat. No. 3,458,491.

This invention concerns the anionic polymerization of nuclear halogenated styrenes and relates to a process for preparing polymers having a high percentage of predetermined reactive end groups.

It is known that in the polymerization of anionically polymerizable monomers the growing polymer chain may be terminated by any of a variety of molecules or ions which are present in the polymerization system. Such termination is undesirable because it usually produces polymers of lower molecular weight than is desired. If the polymer molecule can be maintained with negatively charged, reactive end groups with the capability of continuing its growth, it has been known in prior art as a "living" polymer. In this condition, the polymer molecule can be grown to greater and greater molecular weights by the addition of more and more monomer units; or, alternatively, the living polymer molecule can be deliberate-terminated by groups having certain desirable characteristics, for example, groups that can be subsequently used to produce cross-linking between adjacent polymer chains.

In the Journal of Polymer Science, vol. 60, pages 99–111, F. Wenger discusses batch anionic polymerizations, and the effects impurities in the polymerization system have on the control of such polymerizations. It is shown that impurities tend to terminate the growing polymer chains and thereby to reduce the desired molecular weight of the product. In the Szwarc patent, U.S. 3,070,579, there is a discussion of "living" polymers and how they may be killed by molecules or ions which react with the end of the growing chains. The patentee describes how the "living" polymer reacts with certain materials to cause the polymer to acquire certain predetermined desirable end groups on the polymer chain. Specific examples teach the preparation of a polystyrene whose polymer chains are terminated with end groups such as carboxy, carbodithio, hydroxyl, hydroxypropyl, and the like. If the "living" polymer is killed by the addition of carbon dioxide to the polymerization system, the polymer will have carboxylic acid groups (—COOH) in the terminal positions of the polymer chains, and if the "living" polymer is killed with carbon bisulfide, the polymer will have carbodithiolic acid groups (—CSSH) in the terminal positions of the polymer chain. While processes such as that of the Szwarc patent produce polymers with predetermined end groups, with some monomers the processes tend to produce polymers having a broad molecular weight distribution. Furthermore, the ratio of desirable end groups to undesirable end groups is not as high in the product of the Szwarc process as is often desired.

Accordingly, it is an object of the invention to provide a process for the anionic polymerization of nuclear halogenated styrenes. Another object is to prepare polymers of nuclear halogenated styrenes having the general formula

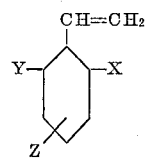

wherein X and Y represent hydrogen, chlorine, bromine, or alkyl having from 1 to 4 carbon atoms with the proviso that at least X or Y is chlorine or bromine, and Z is hydrogen or alkyl. A further object is to prepare polymers having reactive end groups and a predetermined molecular weight.

The process of the invention involves the anionic polymerization of a monomer having the above general formula with a catalyst such as an alkali metal alkyl, an alkali metal aryl, or an alkali metal complex in an inert solvent at a polymerization temperature of from about −80° C. to about −10° C. and in a manner such that the polymer has reactive, negatively charged end groups which can be terminated by adding an external terminating agent, e.g., water, carbon dioxide, ethylene oxide, carbon bisulfide, or methyl alcohol, and recovering the polymer. The process permits the preparation of polymers having a narrow molecular weight distribution and selected end groups.

Among halogenated styrene monomers that can be used are o-chlorostyrene, o-bromostyrene, 2,6-dichlorostyrene, 2,6-dibromostyrene, 2-chloro-4-methylstyrene, 2-bromo-4-isopropylstyrene, 2-chloro-6-methylstyrene, 2-bromo-4-t-butylstyrene, or 2,6-dibromo-4-ethylstyrene.

It is important in polymerizing the nuclear halogenated styrenes to select the monomer and catalyst and subject them to polymerization conditions wherein the rate of internal chain termination is sufficiently inhibited or retarded, i.e., slowed down, so that the rate of polymerization is substantially faster than the rate of termination, and results in a polymer having a desired molecular weight and a high proportion of "living" ends.

As long as a growing polymer chain is not terminated, it is a "living polymer." The longer the polymer can remain as a "living polymer," the greater will be its molecular weight. When polymer chains are terminated, they are terminated at various times, and, therefore, at various molecular weights, and accordingly as more and more of the chain is terminated internally, the molecular weight distribution becomes broader and broader. It is preferred to produce polymers having narrow molecular weight distribution to obtain a more uniform product having an optimum combination of strength properties and flow properties.

It is important, if one wishes to reduce the amount of internal chain termination to remove as many impurities from the reactants as is practical. The rate of internal chain termination also appears to be a function of temperature, in that higher rates of internal termination occur as higher polymerization temperatures are employed. The rate of termination is also dependent in part upon the catalyst, and the monomer, employed. For the monomers with which this invention is concerned, it is necessary to employ temperatures as low as about −80° C. or below, in order that the rate of internal chain termination be low enough to be negligible, although useful polymers can be made at temperatures between about −80° C. and −10° C.

It has been found that if the "living" polymers are externally terminated within a very short time, generally less than about 10 minutes, after the beginning of polymerization at a temperature between about −80° C. and −10° C., a high molecular weight polymer can be obtained having only a small percentage of its end groups produced by internal chain termination. While the polymerization rate of such a monomer may be slowed down by lowering the polymerization temperature, the polymerization rate is usually not decreased as much as is the rate of internal chain termination.

An embodiment of the invention is that it provides a means for preparing polymers with selected end groups. Many desired characteristics are attributable to specific types of end groups. The capability of changing a thermoplastic polymer into a thermosetting polymer can be accomplished by preparing a polymer with functional end groups which can later be reacted to produce cross-linking bridges between adjacent polymer chains. If polymer chains are prepared with carboxylic acid end groups, these polymers can later be reacted with a glycol to produce bridging ester group linkages between polymer chains. It is also known that the solubility of a polymer can be altered by changing the end groups on the polymer chains.

In order to produce a substantially homogeneous material, it has been determined that the "living" polymer, before external chain termination should have at least about 80 percent of its end groups unterminated, that is, having end groups that are the negatively charged groups derived from the growing polymer chain. In this condition, the end groups will react with a suitable external termination agent and produce a polymer with at least 80 percent of its end groups being of the desired type.

External chain terminating agents which can be added to the anionic polymerization system of this invention are known. The above-mentioned Szwarc patent lists several. Among those which are highly useful are:

(1) carbon dioxide, which produces the carboxyl group (—COOH);

(2) carbon bisulfide, which produces the carbodithiol group (—CSSH); and (3) ethylene oxide which produces the hydroxyethyl group (—CH$_2$—CH$_2$OH), (4) proton donors such as water, alcohols or acids produce the hydrocarbon group (—CH$_3$). Other reagents to produce other end groups will be apparent. The preferred external terminating agents are water, methyl alcohol, carbon dioxide, lower alkylene oxides, e.g., ethylene oxide, propylene oxide, and butylene oxide, ethylene sulfide, propylene sulfide, butylene sulfide and carbon disulfide.

A more detailed understanding of this invention may be had by reference to the following examples in which parts and percentages are by weight unless otherwise specified. In these examples, all work was performed under a blanket of nitrogen and all reagents were maintained pure and especially free of moisture and oxygen. Tetrahydrofuran was purified by adding it to a complex of sodium and naphthalene in tetrahydrofuran, and then distilling it from the complex under a nitrogen blanket. α-Methylstyrene was collected directly from a distillation apparatus under nitrogen. Other liquid monomers were distilled under vacuum directly into a receiving burette.

The initiator in several of the examples is a complex of sodium and α-methylstyrene dissolved in tetrahydrofuran. This complex is prepared in a three-neck, fluted flask, equipped with a condenser, nitrogen bubbler, and a stirrer. The third neck of the flask is used for adding reagents. A typical example of the complex preparation is to add to the flask 390 ml. of α-methyl styrene, 1110 ml. of tetrahydrofuran, and 0.7 gram of anthracene. To this mixture, potassium metal is added until the solution turns to a very light red color, usually after the addition of about 0.1 to 0.2 gram of potassium. Then 75.3 grams of sodium dispersion, containing 51.3 percent of metallic sodium is added drop-wise over a period of 8 minutes. The flask is cooled by a stream of cold air. After addition and reaction of the sodium, the solution is allowed to warm to room temperature. The strength of the complex is determined by a titration procedure in which 10.0 ml. of the complex is taken into a hypodermic syringe and then added to 15 ml. of n-butyl bromide in an Erlenmeyer flask. The butyl bromide reacts with the complex and liberates sodium bromide. The bromide ion which is produced is titrated by the Mohr titration procedure. The normality of the complex is that volume of solution which will supply 1 equivalent of sodium. The above complex was formulated to be 1.00 normal, and after titration was determined to be 1.04 normal. When the complex was ready for use, it was forced into a purged burette by nitrogen pressure. The burette containing the complex and the burette containing the monomer feed solution were connected to Zenith pumps run by variable speed air motors. The solutions were pumped through two heat exchanger coils in a bath surrounding the polymerization apparatus. The polymerization apparatus was a vessel with a high speed agitator, two inlet ports for the complex and monomer, and an outlet port for the product polymer. The agitator turned at approximately 2000 r.p.m. and performed a highly efficient mixing operation while the monomer was polymerizing. Samples of the reacted mixture containing the polymerized product, i.e., the "living" polymer, were collected and held for various lengths of time and then terminated with the desired external terminating agent.

The following examples illustrate ways in which the principle of the invention have been applied, but are not to be construed as limiting its scope.

EXAMPLE 1

An alpha-methylstyrene sodium complex catalyst in tetrahydrofuran (THF) was prepared employing sodium metal and procedure similar to that described in Example 1 of U.S. Patent No. 2,985,594. The sodium was titrated. It was found to be 0.477 normal. The monomer feed solution was made by distilling, under vacuum, 250 ml. of o-chlorostyrene into a burette; then 755 ml. of pure THF were added to the burette. Both the monomer feed and the complex were held at room temperature until used. The polymerization apparatus was a vessel equipped with a high speed agitator, having inlet ports for feed of the complex and monomer, and an outlet port for the product. The agitator turned at approximately 2000 r.p.m. During polymerization, the complex catalyst solution was fed into the mixer at the rate of 125 ml./min. The monomer solution was fed at the rate of 57.6 ml./min. After allowing several milliliters of the reacted mixture containing the "living" polymer to pass through the polymerizer to purge it, samples were collected. This was done by allowing the reacted mixture containing "living" polymer under nitrogen to pass into small collection burettes which were maintained at 0° in an acetone bath. Weighed samples of the product, i.e., the "living" polymer solution, were collected and were held for various lentghs of time as stated in the following table. When a given sample had been held for a desired time, it was terminated by forcing a portion of it under nitrogen pressure into a tared Erlenmeyer flask containing 50 ml. of water. The flask was then reweighed to determine the weight of polymer solution added. The amount of chloride ion which had been generated was determined by a standard Mohr titration. In a second series of experiments the polymerizer bath was cooled to −20° C. and the polymerization experiments rerun at −20° C. Table I identifies the experiments, gives the time for which the reacted material was held before terminating it and gives the proportion of "living" end groups and the proportions of terminated end groups in the polymer at the total time.

TABLE I

| Run No.: | Temp., °C. | Time, min. | End groups in polymer | |
|---|---|---|---|---|
| | | | Percent living | Percent terminated |
| 1 | 0 | 0.16 | 95.3 | 4.7 |
| 2 | 0 | 3.32 | 83.2 | 16.8 |
| 3 | 0 | 10.17 | 79.8 | 20.2 |
| 4 | 0 | 15.53 | 89.5 | 19.5 |
| 5 | 0 | 21.14 | 80.2 | 19.8 |
| 6 | 0 | 27 | 77.8 | 22.2 |
| 7 | −20 | 0.16 | 99.1 | 1.0 |
| 8 | −20 | 4.0 | 96.7 | 3.7 |
| 9 | −20 | 9.56 | 96.1 | 3.9 |
| 10 | −20 | 14.95 | 95.3 | 4.7 |
| 11 | −20 | 19.88 | 94.8 | 5.2 |
| 12 | −20 | 25.17 | 95.0 | 5.0 |

The drawing is a graph of the percent terminated end groups versus time in minutes for each of the reaction temperatures 0° C. and −20° C.

EXAMPLE 2

(A) A sodium-naphthalene complex catalyst was prepared by dissolving 32 grams of naphthalene in 500 ml. of tetrahydrofuran. The mixture was stirred while adding 11.9 grams of a sodium metal dispersion (51% by weight in Stoddard solvent). Upon completing the reaction the catalyst solution was titrated and found to be of 0.394 normality.

(B) A charge of 250 ml. of tetrahydrofuran was added to a three-neck glass reaction vessel equipped with a stirrer. It was stirred while adding enough of the catalyst solution to cause it to change to a light green color. Thereafter, 18.6 ml. more of the catalyst complex prepared in part A of this example was added. The reaction vessel was placed in a constant temperature batch maintained at −30° C. The mixture was stirred. A feed solution consisting of a mixture of 20 ml. of tetrahydrofuran and 50.3 grams of o-chlorostyrene was added dropwise over a period of 17.5 minutes. The first few drops of the feed solution changed the reaction mixture to a red color which color was retained throughout the reaction. The mixture was cooled to −40° and stirred for five minutes longer. The polymer was precipitated by pouring the reacted mixture into methyl alcohol. It was separated by filtering and was washed and dried. There was obtained 50.7 grams of polymer. The polymer had a viscosity characteristic of 6.53 centipose as determined for a 10 weight percent solution of the polymer in pyridine at 25° C. The theoretical molecular weight was 14,000, if no cross-linking by termination of reactive ends between polymer molecules occurred. The molecular weight of the polymer by analysis was 52,700.

EXAMPLE 3

A charge of o-chlorostyrene was polymerized employing procedure similar to that employed in part B of Example 2, except that a sodium-biphenyl complex catalyst in tetrahydrofuran was used. The polymer had a viscosity characteristic of 15.9 centipoise and a molecular weight of 97,300 by analysis. The yield of polymer was 100 percent.

EXAMPLE 4

A charge of o-chlorostyrene was polymerized employing procedure similar to that employed in part B of Example 2, except using n-butyl lithium as the catalyst. The polymer had a viscosity of 4.4 centipoise and a molecular weight of 30,400 by analysis. The yield of polymer was 99 percent.

EXAMPLE 5

The procedure of Example 4 was repeated, except using 2,6-dichlorostyrene as the monomer and a polymerization temperature of −78° C. The yield of polymer was 99 percent. It had a viscosity of 2.11 centipoise and a molecular weight of 20,500 by analysis. The theoretical molecular weight was 17,000.

EXAMPLE 6

The procedure of Example 5 was repeated, except using a sodium-naphthalene complex catalyst in tetrahydrofuran. The yield of 2,6-dichlorostyrene polymer was 99 percent. The polymer had a viscosity characteristic of 15.6 centipoise and a molecular weight of 81,400 by analysis.

EXAMPLE 7

The procedure of Example 3 was repeated, except using o-bromostyrene as the monomer and −60° C. as the polymerization temperature. The yield of polymer was 97 percent. The polymer had a viscosity characteristic of 20.5 centipoise and a molecular weight of 150,000 by analysis. The theoretical molecular weight was 18,000.

EXAMPLE 8

The procedure of Example 7 was repeated, except using sodium-alpha-methyl-styrene complex catalyst in tetrahydrofuran. The yield of polymer was 96 percent. It had a viscosity of 3.11 centipoise and a molecular weight of 31,900.

EXAMPLE 9

A charge of 2,6-dichlorostyrene was polymerized at −78° C. using sodium-alpha-methylstyrene complex catalyst in tetrahydrofuran and procedure similar to that employed in Example 3. The yield of polymer was 99 percent. It had a viscosity of 2.1 centipoise and a molecular weight of 19,000 by analysis.

EXAMPLE 10

A charge of o-chlorostyrene was polymerized at −78° C. employing a sodium-naphthalene complex catalyst in tetrahydrofuran and procedure similar to that employed in Example 2. The yield of polymer was 99 percent. It had a viscosity of 6.97 centipoise and a molecular weight of 58,400.

EXAMPLE 11

A charge of o-chlorostyrene was polymerized at −78° C. employing n-butyl lithium as the catalyst and procedure similar to that employed in Example 2. The yield of polymer was 99 percent. It had a viscosity of 3.30 centipoise and a molecular weight of 22,400.

I claim:

1. A process which comprises initiating the polymerization of a halogenated styrene having the general formula

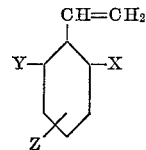

wherein X and Y each represent a member of the group consisting of hydrogen, chlorine, bromine and alkyl radicals having from 1 to 4 carbon atoms and at least X or Y is halogen, and Z is hydrogen or alkyl, with a catalyst selected from the class consisting of an alkali metal alkyl, an alkali metal aryl, and an alkali metal complex, in an inert solvent at a temperature between about −80° C. and −10° C., permitting said monomer to polymerize into a polymer having reactive, negatively charged end groups, reacting said polymer with an external terminating agent while at least 80% of the end groups of said polymer are still reactive, negatively charged end groups, and recovering a polymer having at least 80% of the end groups of said polymer derived from said external terminating agent.

2. A process as claimed in claim 1, wherein the halogenated styrene is o-chlorostyrene.

3. A process as claimed in claim 1 wherein the halogenated styrene is o-bromostyrene.

4. A process as claimed in claim 1 wherein the halogenated styrene is 2,6-dichlorostyrene.

5. A process as claimed in claim 1 wherein the alkali metal is sodium.

6. A process as claimed in claim 5 wherein the catalyst is sodium naphthalene.

7. A process as claimed in claim 5 wherein the catalyst is sodium biphenyl.

8. A process as claimed in claim 5 wherein the catalyst is sodium α-methylstyrene.

9. A process as claimed in claim 1 wherein the catalyst is butyl lithium.

10. A process which comprises initiating the polymerization of 2,6-dichlorostyrene with sodium α-methylstyrene in tetrahydrofuran at about −78° C., permitting said monomer to polymerize for less than about 10 minutes into a polymer having at least 80% reactive, negatively charged end groups, adding an external terminating agent and recovering the polymer having at least 80% of the end groups of said polymer derived from said external terminating agent.

11. A process which comprises initiating the polymerization of o-chlorostyrene with n-butyl lithium in tetrahydrofuran at about −78° C., permitting said monomer to polymerize for less than about 10 minutes into a polymer having at least 80% reactive, negatively charged end groups, adding an external terminating agent and recovering the polymer having at least 80% of the end groups of said polymer derived from said external terminating agent.

References Cited

UNITED STATES PATENTS

| | | | |
|---|---|---|---|
| 3,346,666 | 10/1967 | Dennis | 260—879 |
| 3,458,491 | 7/1969 | Dennis | 260—94.2 |

JOSEPH L. SCHOFER, Primary Examiner

W. F. HAMROCK, Assistant Examiner

U.S. Cl. X.R.

260—94.2, 95